Oct. 2, 1934.        R. B. FAGEOL        1,975,263
SHACKLELESS SPRING SUSPENSION FOR ROAD VEHICLES
Filed Jan. 24, 1931       2 Sheets-Sheet 1
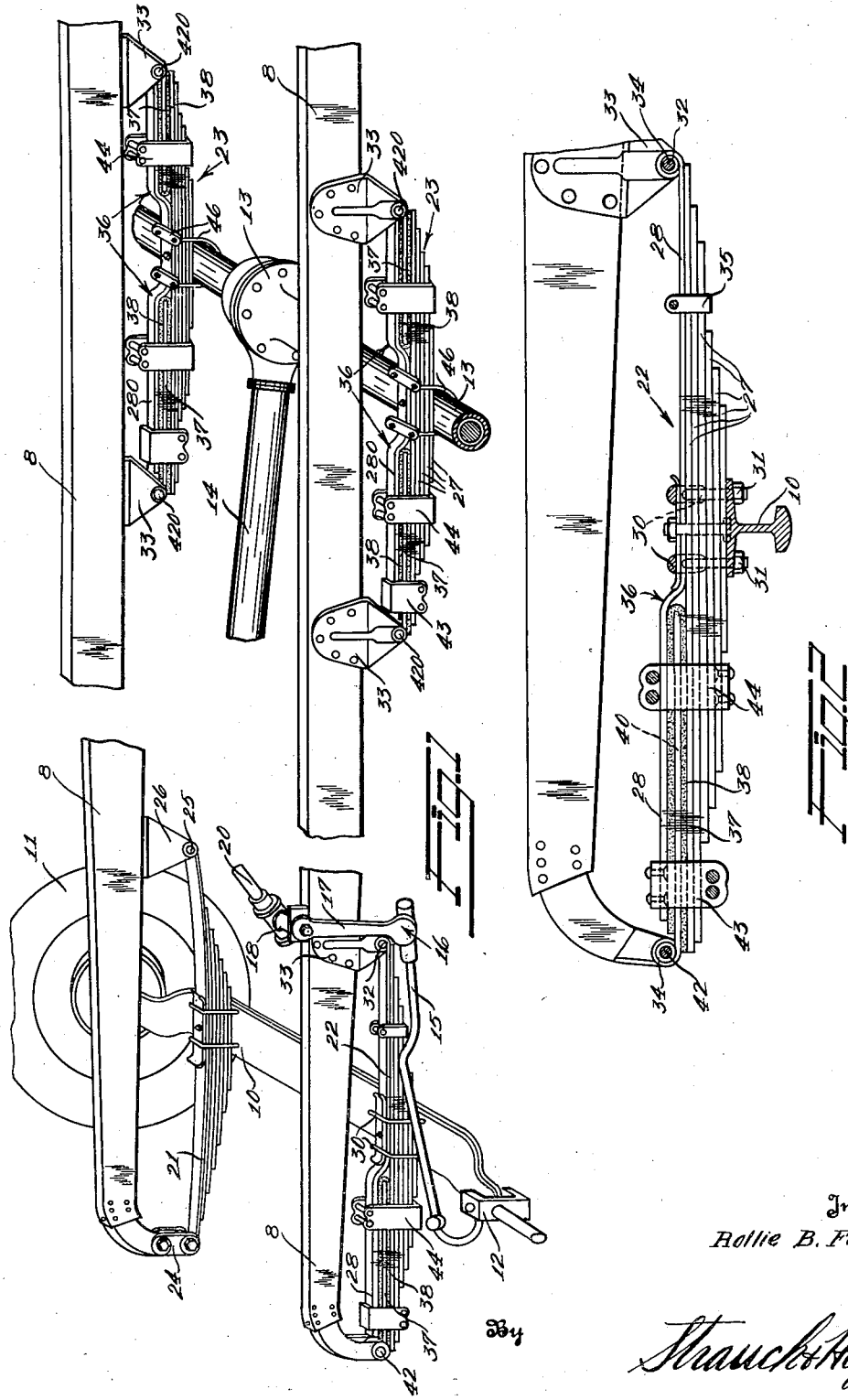
Inventor
Rollie B. Fageol
By
Strauch & Hoffman
Attorneys Oct. 2, 1934.  R. B. FAGEOL  1,975,263
SHACKLELESS SPRING SUSPENSION FOR ROAD VEHICLES
Filed Jan. 24, 1931  2 Sheets-Sheet 2
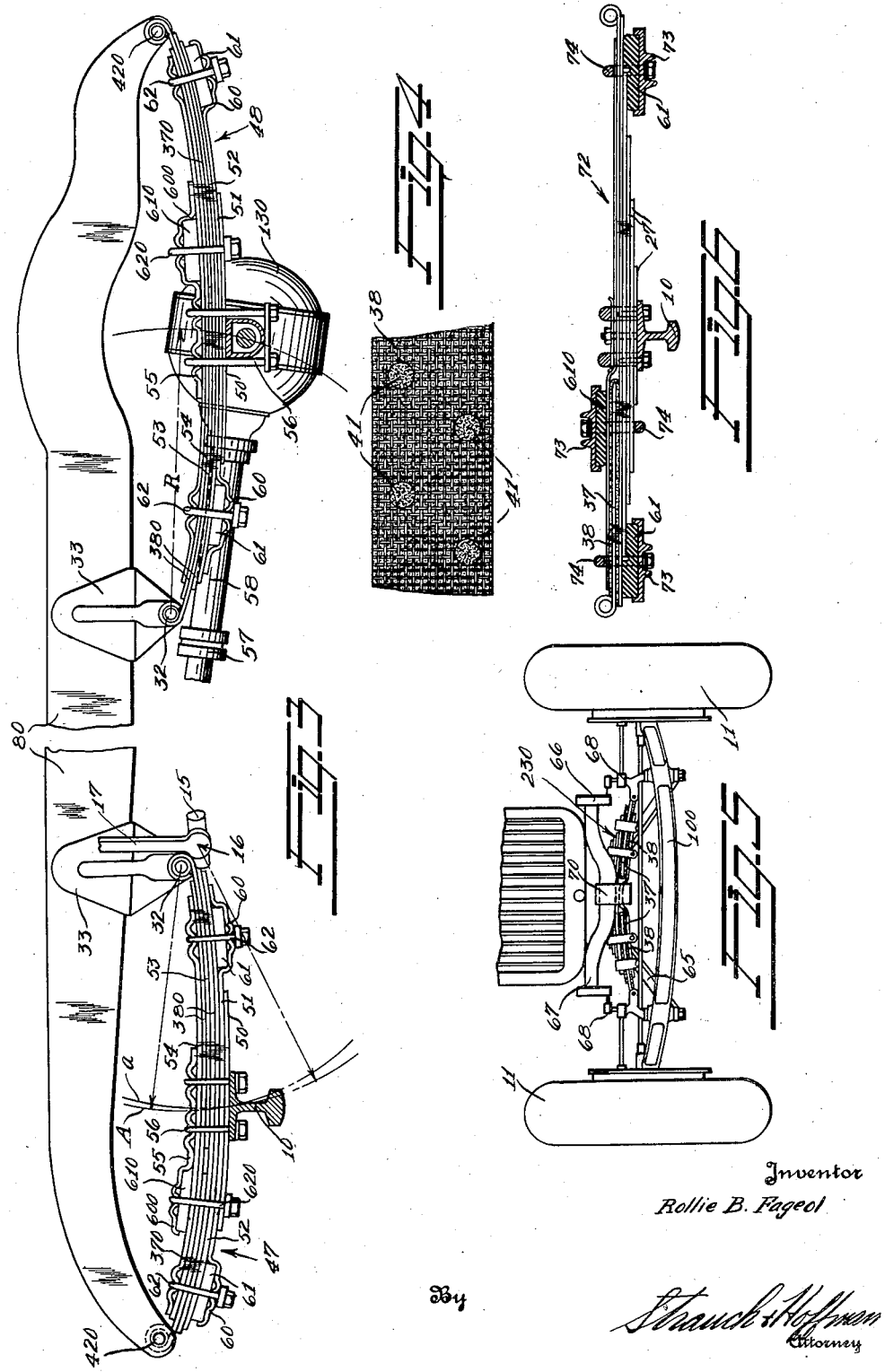
Inventor
Rollie B. Fageol
By Patented Oct. 2, 1934

1,975,263

UNITED STATES PATENT OFFICE 1,975,263

SHACKLELESS SPRING SUSPENSION FOR ROAD VEHICLES

Rollie B. Fageol, Los Angeles, Calif.

Application January 24, 1931, Serial No. 511,061

2 Claims. (Cl. 280—95)

This invention relates to improved springs and combinations thereof for use on road vehicles. The invention is especially concerned with suspensions for mounting the frames of vehicles upon their axles, particularly suspensions involving shackleless springs.

Springs having swinging or rocking shackles, or the equivalent thereof, for connecting them to other portions of the vehicle, produce many undesirable characteristics of operation in a vehicle that is traveling over roads having curves and uneven surfaces. Such shackles do not positively prevent lateral movement of the axles relative to the frame and, especially when their pivotal connections have become worn or distorted, they permit excessive axle flexibility with consequent excessive drag and wear upon the tires. Another undesirable characteristic of such springs is that they permit an axle movement that causes excessive noise and vibration; that, in the case of a front axle having dirigible wheels, causes "shimmy" and "wabble"; and that, in the case of a rear drive axle having jointed driving connections, causes excessive pounding and slipping in the driving connections. These last mentioned defects become more pronounced in most of the conventional constructions because in the first instance the frame pivots of the steering drag link and the corresponding spring are arranged either at opposite sides of the front axle or on the same side at relatively widely spaced points; and in the second instance the frame pivots of the rear springs are relatively widely spaced, longitudinally of the frame, from the propeller shaft joint that is commonly disposed just forward of the rear axle.

It is, accordingly, the primary object of the present invention to remedy all of the above mentioned defects and disadvantages, preferably by the utilization of shackleless springs and by the proper disposition of the spring pivots upon the frame.

I am aware of the fact that shackleless springs have been proposed, but they have been impracticable because of unsolved problems of lubrication, defective construction of the spring per se, and improper combination of the springs with the frame and other structure of the vehicle. I am further aware of proposals to aline the drag link and spring pivots transversely of the frame to improve steering conditions, but the proposed solutions have been unsatisfactory because of the types of springs employed in the combinations.

It is, therefore, a major object of my invention to carry out the purpose of the aforestated primary object in a commercially practical manner. Other objects, more specific, and subordinate to the primary and major objects of the present invention, are as follows:

An important object of this invention consists in the provision of a shackleless spring that is not too flexible and which, nevertheless, may automatically be elongated and shortened without excessive friction and without spring distortion. In this connection it is a further object to pivot such a spring upon the vehicle frame in a manner to substantially eliminate "shimmying", "wabbling", "tramping", etc.

It is another object of the present invention to provide a shackleless spring beam of the leaf type, with both ends of the beam adapted for direct connection with portions of the frame or other parts of the vehicle, and with at least one of the leaves designed for frictionless sliding movement longitudinally of the beam between its frame pivot and that portion of the beam to which the axle is clamped. It is a further object to control the said sliding movement to prevent lateral flexibility of the beam and, if desired, to render the spring capable of absorbing shocks and dampening vibrations.

Further major objects of my invention reside in the provision of various novel combinations, in several types of vehicles, of one or more of my improved shackleless springs.

The foregoing and other objects of the present invention will appear and be more fully understood upon a study of the following detailed description and the appended claims, when taken in conjunction with the accompanying drawings, wherein:

Figure 1 is a view in perspective of front and rear portions of a vehicle chassis having some of the improvements of my invention embodied therein.

Figure 2 is an enlarged detail view, in side elevation and partly in section, of one of the front suspensions seen in Figure 1.

Figure 3 is a side elevational view, with certain parts in section, of a portion of a vehicle chassis having springs of modified form and a different type of drive than that seen in Figure 1.

Figure 4 is an enlarged detail in plan of a portion of a strip of the lubricating material forming part of the springs of Figures 1-3.

Figure 5 constitutes a front elevational view of a Ford chassis modified to embody a shackleless spring of the present invention.

Figure 6 represents a side elevational view, with certain elements in section, of another modified form of the shackleless spring beam of my invention.

With continued reference to the drawings, wherein like numerals are employed to designate like parts, and with particular reference to Figures 1 and 2, numeral 8 indicates the main frame of a vehicle chassis. This frame is mounted above a conventional front axle 10 having dirigible wheels 11 and steering knuckles 12, and a conventional rear drive axle assembly 13 that includes a torque tube 14 rigidly secured to the usual differential housing of the assembly. The forward end of the tube 14 is universally connected to a cross member (not shown) of the frame, and radius rods may be employed to strengthen the rear axle assembly if desired.

The visible steering knuckle 12 in Figure 1 is controlled by a drag link 15 that extends rearwardly for pivotal connection, as at point 16, with the lower end of a steering arm 17. The latter is operable in a conventional manner through steering mechanism 18 and steering column 20. A tie rod (not shown) of course interconnects the dirigible wheels so that they may be steered simultaneously through the arm 16 and link 15.

The suspensions for mounting the frame upon the axles comprise a set of four spring beams, beams 21 and 22 at the front, and a pair of twin beams 23 at the rear. The front beam 21 is a conventional leaf spring connected at its forward end with the frame by a shackle 24 instead of being pivoted directly thereon in the usual manner, and directly pivoted as at 25 to a frame bracket 26 instead of being shackled thereto in the usual way. The axle 10 thus swings in an arc about the pivot 25. The spring 21 and shackle 24 may, if desired, be replaced by a beam exactly like that at the opposite end of the axle and now to be described.

The beam 22 (see also Figure 2) comprises a stack of superposed spring leaves 27 all of which are substantially flat and which together with a special upper leaf 28, are secured intermediate their ends upon the axle 10 by means of U-bolts 30 that fit around the leaves and project through the axle flanges to receive clamping nuts 31. The rear end of the special leaf 28 is bent to form an eye for directly pivoting it upon a horizontal, transverse pin 32 carried by a special bracket 33. A rubber bushing 34 may be interposed between the eye and the pin. A clip 35 is provided to align the leaves longitudinally and to curb excessive spring reactions.

The forward end of the special leaf 28 is bent, as at 36, adjacent the axle, to provide a slideway or guideway for the reception of a relatively short sliding leaf 37 and its antifriction covering 38. The latter preferably comprises a strip of fabric such as brake lining impregnated with graphite, folded over the sliding leaf and riveted thereto as at 40. As seen in Figure 4, the strip may be perforated at 41 to provide wells for containing a reserve supply of graphite. The lower surface of the special leaf 28 and the upper surface of the top leaf of the set 27 are highly polished to permit the leaf 37, together with its covering 38, to slide freely longitudinally of and relative to the other leaves of the beam. The forward end of the sliding leaf forms an eye and is directly pivoted upon a frame-carried pin 42 in the same manner that the rear end connection of the leaf 28 was made. A pair of U-clips 43 and 44 serve to tie the leaves together in sliding engagement while causing a relatively snug fit of the graphited fabric within its guideway, and further serve as side thrust plates to maintain the sliding leaf 37 in longitudinal alignment with the other leaves.

It will be observed that the rear pivot 32 is substantially or approximately in transverse alignment with the pivotal point 16 at the interconnection of the steering arm and drag link, whereby it results that the connections of the axle with the spring and drag link are approximately equally spaced from a common axis. In other words, the rear portion of the spring restrains the axle to oscillation through a definite arc, and this arc is substantially coincident with that through which the forward end of the drag link is designed to swing, whereby the steering elements suffer no appreciable interference from axle movement. This feature is best illustrated by the arcs A and a drawn on the side elevation of Figure 3, wherein the front end combination is the same as that of Figure 1 except for variations in the structure of the spring per se. Of course the point 16 is not fixed, since it shifts longitudinally when arm 17 is actuated, and, due to this consideration and to the fact that the length of the spring arm between the axle and the pin 32 varies with spring deflection, it is practically impossible to maintain the aforedescribed arcs in exact coincidence at all times. For this reason the point 16 and pin 32 need be placed only in approximate transverse alignment in a manner that will obtain the least interference with the steering mechanism on a vehicle of any particular construction and designed for use through a given range of normal operating conditions. Although a preferred arrangement is shown, the spring 22 may be reversed end for end to place the fixed pivot (center of axle oscillation) at the extreme front end of the frame, the only requisite being that the length of the spring between the axle and said fixed pivot should be such that the arc of axle oscillation will be approximately tangent to the arc of movement of the front end of the drag link.

The spring 22, due to absence of shackles and to the provision of the fabric 38 and bushings 34, is noiseless during operation and tends to damp out any vibrations that ordinarily pass to the frame and body of the vehicle. The leaf 37 and fabric 38, while they slide somewhat freely to serve the functions of the usual shackle, preferably are sufficiently restricted to act as a rebound check and to absorb downward shocks. As already seen, the method of pivoting the springs and drag link is such as to eliminate "shimmy", "wheel wabble" etc. The spring structure itself, however, is such as to greatly reduce these undesirable movements, this being so because the spring is substantially straight and rigid under normal load, with no shackles or extremely flexible spring portions to permit the main body of the spring to approach and recede from the frame independently of deflection of said main body.

The springs 23 at the rear end of the vehicle in Figure 1 are like the front spring 22 except that both ends of each rear spring are duplicates of the forward end of the spring 22. The top leaf 280 of each rear spring is bent at two places, 36, to provide guideways for a pair of sliding leaves 37, one at each end of the spring and each of which is directly pivoted on pins 420 carried by the frame brackets 33. The central portion of each spring, between the bends 36 and the sliding leaves 37, is secured to an end of the drive axle by a clamping assembly 46.

The above described arrangement permits extension of the springs on each side of the drive axle, this arrangement being necessary because of the fact that the torque tube restrains the drive axle to movement in definite arcs. The springs 23 have many of the characteristics and advantages of the spring 22. If desired, the springs 23 may be pivoted on the frame intermediate their ends and connected to the axle at their rear ends, as in one well known type of Ford truck construction.

In the modified form of vehicle illustrated in Figure 3, another form of shackleless spring has been substituted for that of Figure 1, and a flexible propeller shaft such, for example, as used in the Hotchkiss form of drive, has been substituted for the rigid torque tube drive of Figure 1. The chassis of Figure 3 comprises a frame 80 mounted upon a front dead axle 10 and a rear drive axle assembly 130 by means of spring beams 47 and 48 respectively. The beams 47 and 48 are identical except for size, shape and manner of mounting, and hence like reference numerals are applied to the corresponding elements of each.

Each spring of Figure 3 comprises a short strengthening leaf 50 resting upon the axle; a long leaf 51 arranged upon the short leaf and having specially shaped ends for a purpose later to appear; a long flat leaf 52 superposed on the leaf 51; a pair of graphited fabric strips 380 upon the leaf 52 and between which are sandwiched a pair of longitudinally spaced short leaves 370 and 53; and a long leaf 54 disposed atop the strips 380. All of the elements thus far described, except the leaf 370, are rigidly clamped upon the axle by a specially shaped plate 55 and U-bolt assemblies 56.

The leaf 53 is immovably clamped relative to the fabric and the other leaves and has its projecting end pivoted on a bracket pin 32, in this manner fixing the arc of axle oscillation. In the case of the front axle it will be observed that pin 32 is approximately aligned transversely with the point 16 for the beneficial purposes already discussed in connection with Figure 1. It should further be observed that in the rear suspension the pin 32 is approximately transversely aligned with the center of a flexible joint 57 contained in the flexible and extensible propeller shaft 58, whereby the radius R of the arc of axle oscillation about pivot 32 will approximate an arc drawn through the axle with the joint 57 as the center of curvature. As a result of this last mentioned arrangement the usual hammering and excessive slipping in the propeller shaft assembly is greatly reduced.

The short leaf 370 of each spring is polished and is longitudinally slidable between the strips of fabric 380 and has its outwardly projecting end pivoted as at 420, in an end of the frame. The leaf 51 has its ends shaped as indicated to form receptacles 60 for rubber blocks 61 designed to be pressed against the leaf 52 by means of adjustable clips 62 that encompass the ends of leaf 54 and the receptacles 60. These clips longitudinally align the spring elements and cooperate with the rubber blocks to form snubbers and vibration dampeners. The special plate 55 is extended sufficiently to overlap the inner end of the sliding leaf 370 and the extension is shaped to provide a receptacle 600 for a rubber block 610 that is urged against the spring by an adjustable U-clip 620. This arrangement renders the spring shock absorbing and vibrationless, and yieldingly urges the leaves toward one another and the fabric toward the sliding leaf to distribute the load evenly over the entire area of the surface of the latter.

In Figure 5 there is illustrated a portion of a Ford chassis in front elevation, with a shackleless spring of this invention incorporated therein. The chassis includes a front axle 100 having dirigible wheels 11 and being positioned by a wishbone radius rod 65, a main chassis frame 66 having a cross member 67, and a spring beam 230 for mounting the latter upon stanchions 68 rigidly supported adjacent the axle ends. The spring beam 230 is substantially the same as beams 23 of Figure 1, inverted and arranged transversely instead of longitudinally. Its central portion fits up into the frame member 67 and is secured thereto by a U-strap and bolt assembly 70. The sliding leaves 37 of the spring have their outer ends directly pivoted on the stanchions 68. The latter members take the places of the usual posts which carry swinging shackles for connection with the ends of the usual Ford transverse spring.

In the arrangement just described the spring beam operates with many of the desirable functions and characteristics of the other forms of this invention and also serves to prevent side sway of the frame and body of the vehicle. It affords an excellent rebound check and shock absorber. It will be understood that a similar spring may be transversely mounted at the rear end of the chassis.

The spring beam 72 shown in Figure 6 is like that of Figure 2 except for the substitution of the rubber blocks 61 and 610 of Figure 3 for the clips of Figure 2. These blocks 61 and 610 are mounted by means of retaining plates 73 and U-bolt assemblies 74. They serve to align the leaves and distribute the load uniformly over the areas of the latter, to dampen vibrations, check rebound, and absorb shocks. In this, as well as the other forms, the bolt assemblies are adjustable to vary the frictional gripping action upon the sliding spring leaf.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In combination, a vehicle frame; an axle disposed beneath one end of said frame; dirigible wheels at the ends of said axle; steering mechanism, including a steering arm depending at one side of the frame and spaced from the axle, and further including a drag link pivotally connected to said steering arm at one end and having its other end projecting toward the axle for connection with the dirigible wheel at that side of the frame; a longitudinally arranged shackleless spring beam, substantially straight under normal load, for mounting said side of the frame upon that end of the axle adjacent the drag link, said beam having substantially straight ends directly connected to the frame, one end connection being fixed relative to the body of the beam and disposed adjacent the steering arm and the other end connection being longitudinally shiftable relative to the body of the beam; and means securing the beam to said axle at a point approximately the same distance from the fixed end connection as the axle is from the pivotal connection of the drag link on the steering arm.

2. In an automotive vehicle having a frame, and axle disposed therebeneath and an operating mechanism having a transverse pivotal joint connected between the frame and the axle; a longitudinally arranged shackleless spring beam secured to said axle and divided thereby into two end portions, one end portion of said beam being inextensible and directly pivoted on a portion of the frame in approximately transverse alignment with said pivotal joint to position the axle relative to the frame, and the other end portion being directly pivoted on another portion of the frame at a fixed distance from the pivot of said first mentioned end, said other end portion being substantially straight under normal load, relatively heavy and longitudinally extensible to permit limited spring beam deflection without allowing sidesway of the vehicle.

ROLLIE B. FAGEOL.